March 31, 1936.  R. L. CARR  2,036,118
VEHICLE BODY
Filed July 1, 1933    4 Sheets-Sheet 2
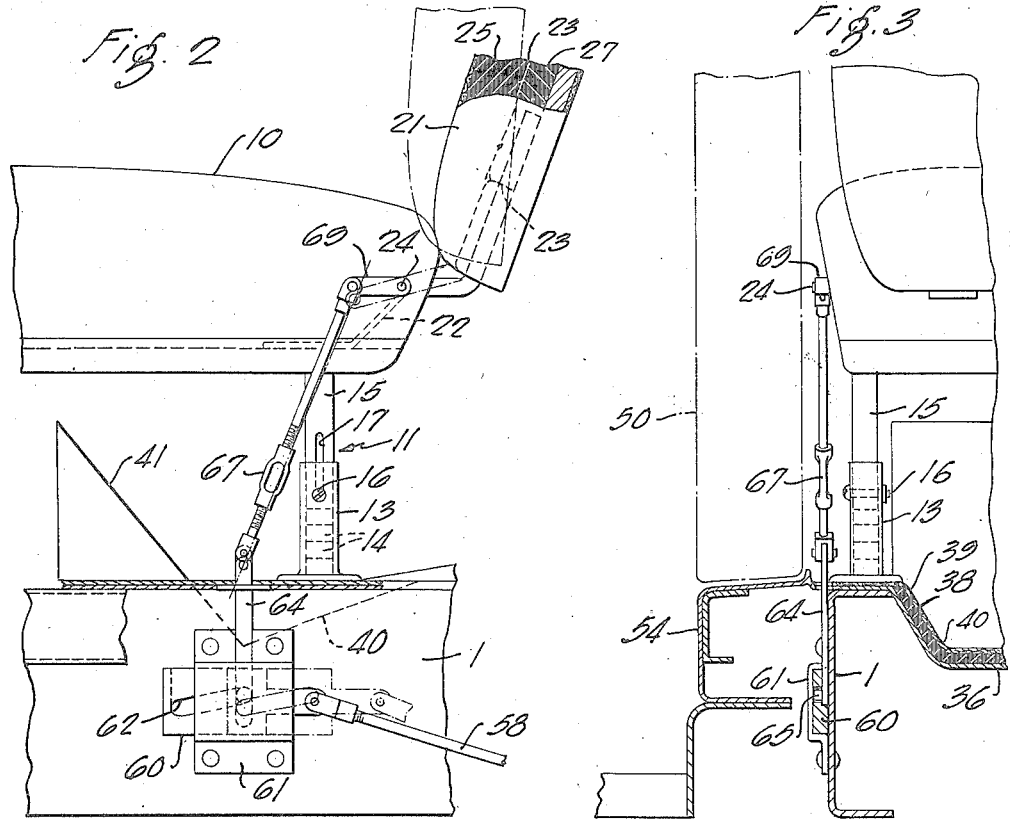
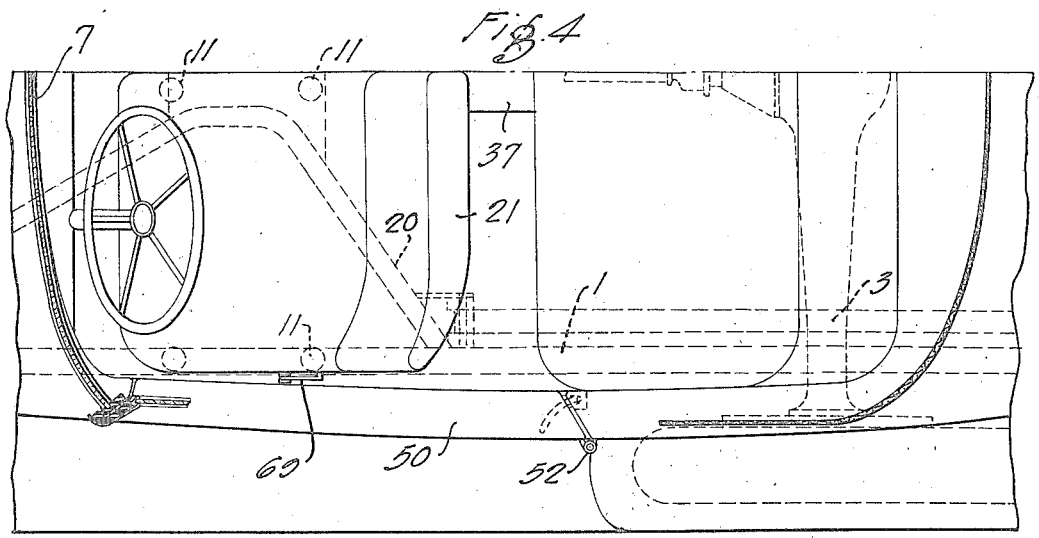
Inventor
Raymond L. Carr March 31, 1936. R. L. CARR 2,036,118
VEHICLE BODY
Filed July 1, 1933   4 Sheets-Sheet 3
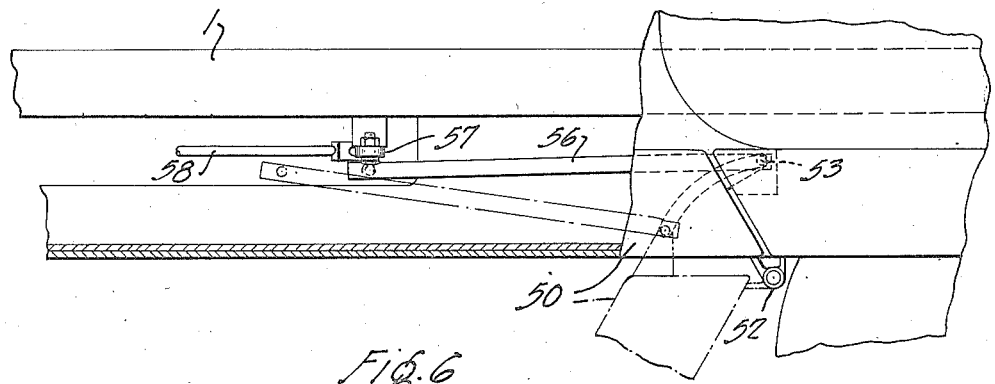
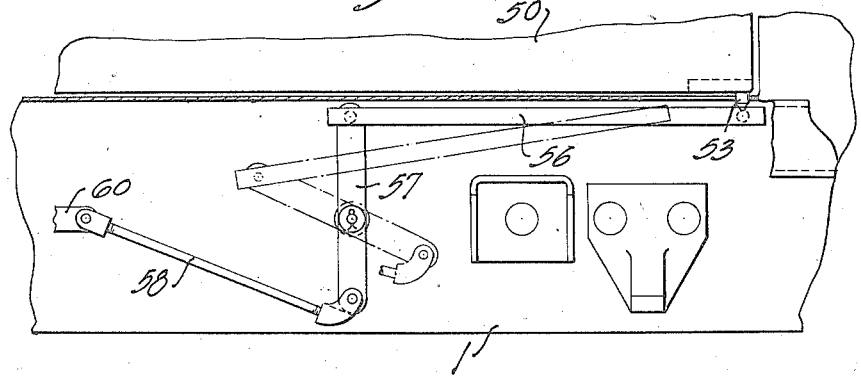
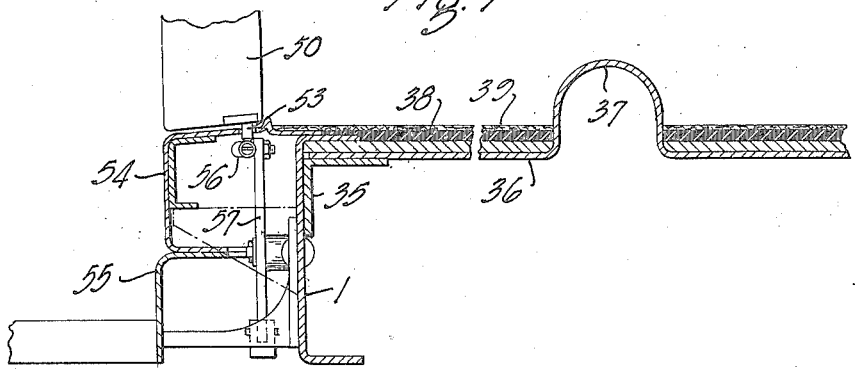
Inventor
Raymond L. Carr

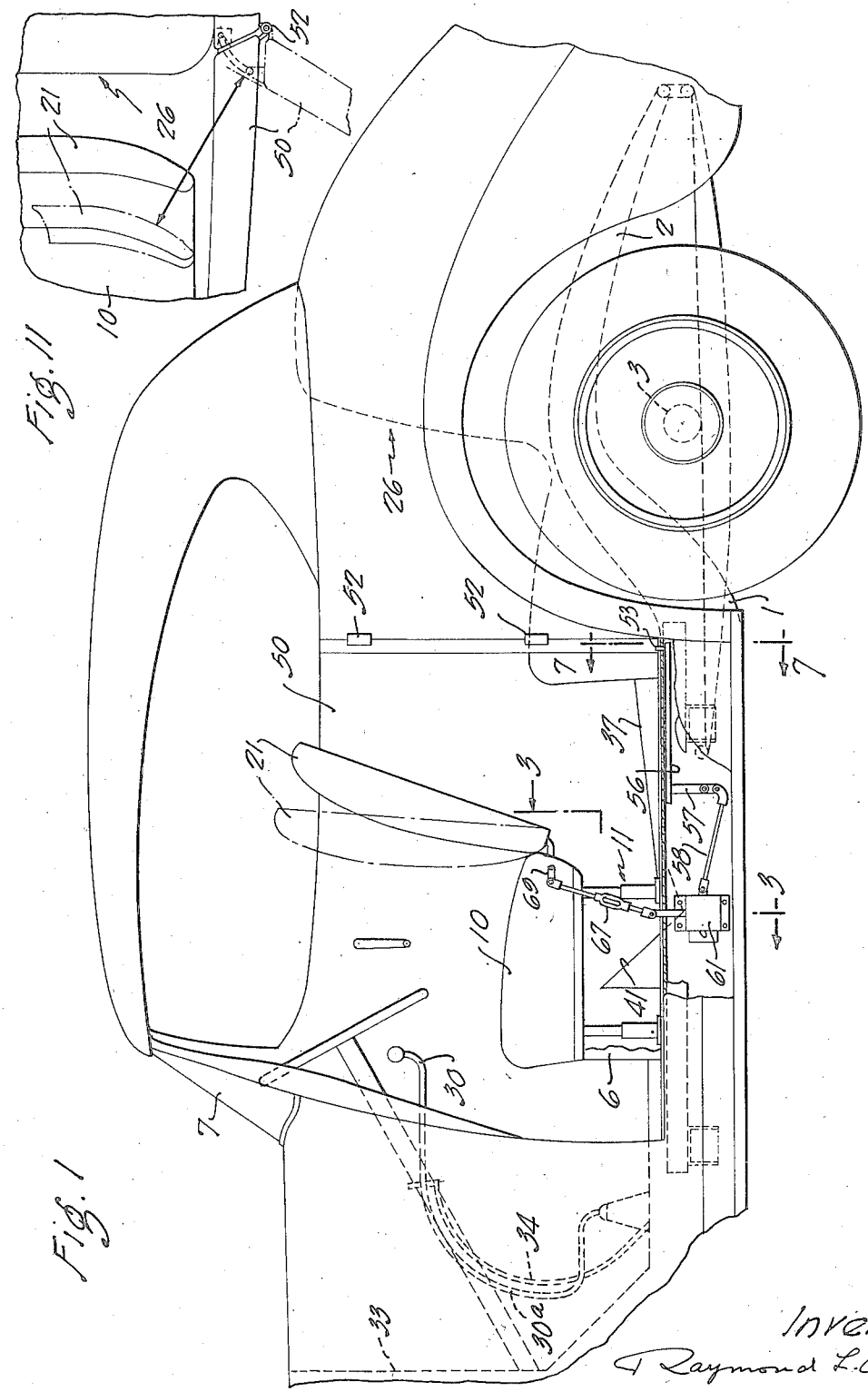

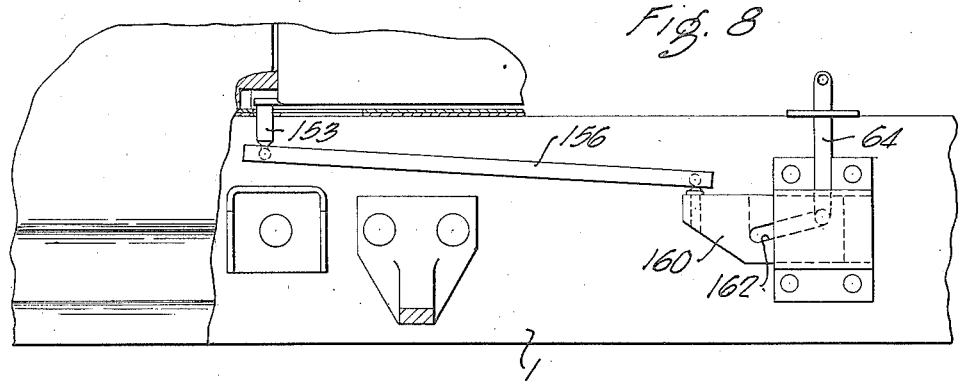
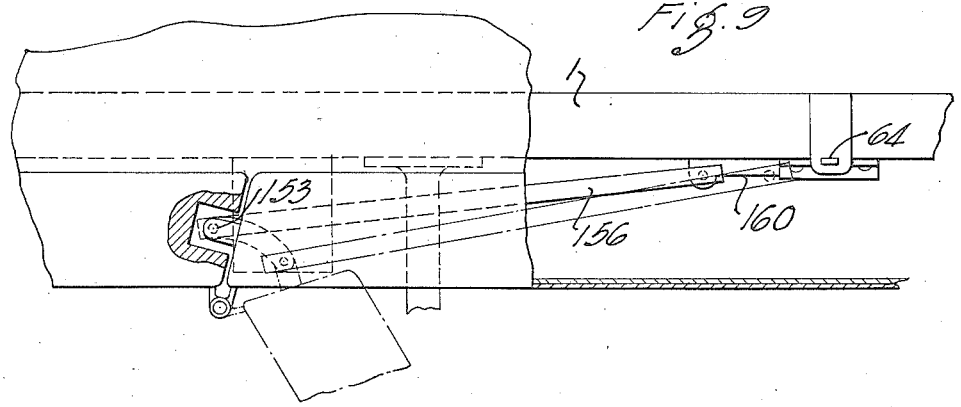
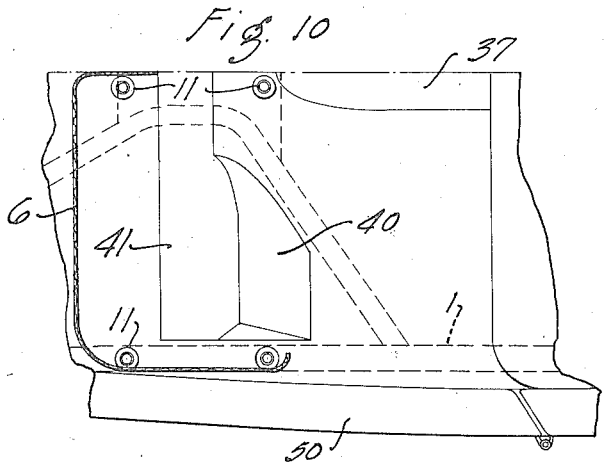

Patented Mar. 31, 1936

2,036,118

UNITED STATES PATENT OFFICE 2,036,118

VEHICLE BODY

Raymond L. Carr, Boston, Mass.

Application July 1, 1933, Serial No. 678,588

7 Claims. (Cl. 296—68)

This invention relates to an improved vehicle body having a compact, yet relatively roomy seating arrangement, while fully meeting modern requirements as to comfort and low seating arrangement. In some respects this invention affords a further development of and improvements upon the arrangement disclosed in my prior application Serial No. 371,163, filed June 15, 1929, which issued on April 10, 1934, as United States Patent No. 1,953,953. As shown in that application, a vehicle body may have closely spaced front and rear seats with the rear seat disposed slightly lower than the front seat, thus permitting additional leg room for the occupants of the rear seat. A single door may be afforded for access to the front and rear seats, and at least a portion of the back of the front seat may be movable in response to door movement to afford room for access to the rear seat without requiring an occupant of the front seat to leave his seat.

In accordance with this invention, the same general arrangement is provided and the back of the front seat is arranged so that it automatically moves out of its upwardly and rearwardly inclined position into a substantially vertical position when the door is opened. Thus an occupant of the front seat may remain seated but the upper portion of his body is pivoted about the hips; in other words, instead of having his back inclining toward the rear, the body is swung forwardly so that the back assumes a substantially vertical position. Thus the general position of the occupant of the front seat is not disturbed; he does not have to move his feet, which may be in engagement with the control pedals; and it is not necessary to call his attention to the desire of a person to enter or leave the rear compartment in order to afford access to this compartment. In other words, no voluntary movement of the occupant of the front seat is required, and the movement of the upper part of his body is such that it is not likely to be disturbing, even if occurring without previous notice.

Accordingly this invention permits the advantages of the coach-type body with the single wide door and the relatively wide window while eliminating the disadvantages which are commonly characteristic of bodies of this type. The invention thus permits the low cost, greater visibility, lighter weight, and more sweeping lines of the coach-type body as well as the greater freedom from rattles, while substantially eliminating the difficulty of access to the rear seat, which often characterizes coach-type bodies, and materially reduces the bother to occupants of the front seat which is caused by movement of the occupants of the rear seat into and out of a place.

The invention further affords an arrangement of the front seats so that their vertical position may be changed to suit the initial requirements of different owners, the connections with the doors including adjustable parts to permit this result. Adjusting means of this type may also be employed with a seat which is adjustable forwardly and rearwardly of the vehicle, if desired. The linkage which is thus connected to the door may also have means associated therewith to act as a stop to limit the angle to which the door may open. An arrangement of this character may be advantageously employed with a new windshield assembly of the general type disclosed and claimed in my copending application Serial No. 690,331, filed September 21, 1933.

In the accompanying drawings:

Fig. 1 is a side elevation of a vehicle body with a portion of the door removed;

Fig. 2 is a side elevation of a portion of the frame, the seat, and related parts, parts being broken away and shown in section;

Fig. 3 is a section on line 3—3 of Fig. 1;

Fig. 4 is a top plan view of a portion of the vehicle body, the windshield and top being shown in section;

Fig. 5 is a plan view of a portion of the body and associated linkage, parts being broken away and shown in section;

Fig. 6 is a side elevation of the assembly shown in Fig. 5;

Fig. 7 is a section indicated by line 7—7 of Fig. 1;

Fig. 8 is an elevational detail of an optional embodiment of the invention, parts being removed and shown in section;

Fig. 9 is a top view of the same, parts being removed and shown in section;

Fig. 10 is a top view of the rear floor assembly and related parts; and

Fig. 11 is a detail plan view showing the manner in which this invention affords access to the rear seat.

In the accompanying drawings, the numeral 1 indicates the frame of the vehicle, which may be of any conventional form and is provided with a kick-up portion 2 extending over the rear axle 3. The front of the vehicle body may be provided with a windshield of the type more particularly described in my copending application Serial No. 690,331, having a glass screen 7 of the general form of a surface portion of a frustum of a wedge with a generally elliptical base, the lower edge of the glass affording a substantial curvature adjoining each standard but having a nearly straight portion adjoining the center part of the cowl, while the upper edge of the windshield is but slightly curved, the entire windshield having a rearward tilt or inclination and the surface thereof being of the type which may be provided by the movement of a straight line to generate a curved surface.

The bottoms 10 of the front seats may be provided with adjustable legs, designated in general by numeral 11, and comprising a lower tubular standard 13 which may contain a plurality of rubber disks or washers 14 (Fig. 2), these disks being removable to permit variation in the height of the seat to suit the desires of the user. A leg element 15 is received in telescoping relation at the upper end of each standard 13 and rests upon the uppermost element 14. A diametrically disposed bolt 16 may extend through the standard 13 and slidably engage a slot 17 in the member 15. At the center of the vehicle the legs 11 may be mounted upon the central part of the X-frame assembly, which is designated in general by the numeral 20 (Figs. 4 and 10). It is thus evident that means is provided permitting the independent locating of each seat at the desired height and permitting variation in the angular positioning or tilt of the seat bottom and, furthermore, that the washers 14, if formed of resilient material such as rubber, are effective in absorbing shocks. Aprons 6 shown partly broken away in Fig. 1 may conceal the legs 11 at the front and sides of the seats.

The back 21 of each front seat may be pivotally mounted on brackets 22 secured to the rear of the bottom portion so that each back 21 may swing forwardly about pins 24, which define a horizontal axis. Any suitable upholstery may be employed for the seat bottom 10 and the back 21. I prefer, however, to provide two layers of sponge rubber, the bottom layer 27 being tied down by cords 23 and the outer layer 25 being readily compressible.

The back seat 26 may be of the same general or any suitable construction, being arranged slightly lower than the front seat 10, the difference in height of the seats being, for example, of the order of from 1½ to 3 inches.

In the front compartment the gear shift lever 30 preferably is provided with a U-shaped intermediate portion 30ᵃ; in other words, this part of the lever is bowed forwardly so that it is disposed near the dashboard 33. The hand brake lever 34 may be similarly formed. It therefore is evident that there is room, particularly under the upper parts of lever 30, for the knees of occupants of the front seat so that comfort of the seat occupants is enhanced, especially when three people occupy the seat.

The front floor boards may be arranged in the conventional manner and extend over the side rails of the frame, while the rear floor may be disposed somewhat lower to correspond to the location of the rear seat. For this purpose the side rails of frame 1 (Fig. 7) may support a metal plate 36 with an upwardly bowed tunnel portion 37, which gradually decreases in height toward the front of the vehicle, as shown in Fig. 1. Above the plate 36 may be a layer of sponge rubber 38 which may be covered by the carpet 39, the latter overlapping the side rail of the frame, as shown.

Beneath the front seat heel depressions 40 (Figs. 2 and 10) may be afforded in the plate 36, these depressions being shaped so that they are disposed forwardly of the rear arms of X member 20 of frame 1 and so that the floor may afford a planar surface beneath the outer rear corners of the front seats. Accordingly a relatively level floor surface is afforded to receive the feet of people entering the car, while the heel recesses permit additional room for the feet of occupants of the rear seat. In front of the heel recesses 40 the plate 37 may be turned up to afford an inclined foot supporting surface or toe board 41.

The body of the vehicle is provided with a relatively wide door 50 upon each side. As shown, for example, in Fig. 1, this door may be mounted upon rear hinges 52. In accordance with this invention means or linkage is provided between the hinge end of each door 50 and the seat backs 21 to permit the swinging of the latter in response to door movement. For this purpose, a depending pin 53 (Fig. 6) is secured to the rear portion of the lower surface of the door and projects downwardly through a curved slot in the body ranger 54 that extends along the body beneath the door. Disposed within this ranger and behind the running board apron 55 is a tubular connecting rod 56 having its rear end provided with a universal connection with the pin or stud 53 and having its front end similarly connected to the swinging lever 57. The lower end of the latter is connected by a link 58 to a pivot upon the rear of a sliding cam block 60. The latter is mounted for horizontal sliding movement in a bracket 61 and is provided with a gradually inclined cam slot 62 (Fig. 2). The bracket 61 is cut away to provide a vertical guide for a vertically disposed link 64 which is provided with a follower pin 65 within the slot 62. The upper end of link 64 is pivotally connected to a rod 67 which may include a turnbuckle adjustment or the like to permit variation in its length, as desired.

When the door is closed, the connecting rod 56, the swinging lever 57 and the link 58 are in the position shown in full lines in Fig. 6, and the cam block 60, the link 64 and rod 67 are in the position shown in full lines in Fig. 2. When the door is opened, the stud 53 swings outwardly and forwardly, as indicated in dotted lines in Fig. 5, thus moving the connecting rod 56 forwardly and swinging the member 57 about its pivotal mounting on the frame. Accordingly the link 58 is pulled rearwardly, thus causing the sliding of block 60 in bracket 61 and the downward movement of link 64 due to the action of the cam means 62—65. Thus the link 67 is pulled downwardly and the arm 69, which is connected to the seat back, is swung in a counterclockwise direction, as viewed in Fig. 2, thus causing the seat back to swing to the position indicated in dot and dash lines in Fig. 1. In this position of the parts, the trunk of a person occupying the seat is disposed substantially vertically and there is a substantially greater distance between the back of the front seat and the nearest portion of the door opening; for example, the additional room afforded in this manner may be of the order of five or six inches. The arrow marked D in Fig. 11 shows the room thus afforded for access to the rear compartment.

Obviously the arrangement of the slot 62 is such that the linkage is irreversible so that there is little tendency of the weight of a person leaning against the seat back to cause the door to close when it is in its open position. With the arrangement of the parts shown, the initial movement of the door toward open position is somewhat more rapid than the final movement thereof. Obviously the relative speeds of door and seat back movement may be varied to suit the tastes of the individual designer by varying the normal inoperative position of the swinging member 57 and/or by varying the shape of the cam groove 62. When the door is closed, obviously the parts of the linkage move in opposite directions and the seat back is returned to its original position. The adjustable connection 67 may be manipulated to cause alteration in the normal angle of the seat, as desired, without affecting the range of movement of the seat when the door opens. This adjustment also permits proper compensation for a change in the relative position of the seat back and the cam means 62—65 when the vertical adjustment of the seat is altered. It is also evident that the adjusting means 67 may be employed in connection with a seat movable longitudinally of the vehicle to various adjusted positions. Thus if the seat illustrated in Fig. 10 were moved forwardly, the link would be shortened to maintain the seat back at the desired angle. The covers or aprons 6 (Figs. 1 and 10) may be arranged to conceal the seat legs 11, the toe board 41 and the major portion or all of the linkage connected to the seat back, thus affording an improved appearance when the door is opened. Preferably the upper end of apron 6 is disposed adjoining and secured to the lower part of the seat bottom, being arranged however so that the upper part of link 67 may move in a space between the seat bottom and the apron.

An arrangement of this character is also adapted for use with a door 151 which is hinged at its forward end. Such an arrangement is illustrated in Fig. 8, wherein the depending stud 153 is directly connected by a tubular connecting rod 156 to a ball member on the front end of the cam block 160. This block may be provided with a slot 162 similar to the slot 62 and may be connected to a link 64 of the same type as has already been described. It is evident that the door 151 may swing forwardly in the same general manner as the door 51 swings rearwardly, thus causing the rearward movement of connecting rod 156 and directly effecting the rearward movement of cam 160, thus causing the downward movement of link 64 which moves the seat back in the manner already described.

I claim:

1. A vehicle body comprising a body wall having a single door therein, a front seat and a rear seat to which the door affords access, the back of the front seat being adapted to swing about a pivotal axis near its lower end, and mechanism connecting the door and seat back so that the seat back swings forwardly when the door is opened, thus to afford additional room for access to the rear seat.

2. A vehicle body comprising a body wall having a single door therein, a front seat and a rear seat to which the door affords access, the back of the front seat being adapted to swing about a pivotal axis near its lower end, and linkage connecting the door and seat back so that the seat back swings forwardly when the door is opened, thus to afford additional room for access to the rear seat, said linkage being irreversible so that pressure upon the seat back does not cause closing of the door.

3. A vehicle body comprising a body wall having a single door therein, a front seat and a rear seat to which the door affords access, the back of the front seat being adapted to swing about a pivotal axis near its lower end, and linkage connecting the door and seat back so that the seat back swings forwardly when the door is opened, thus to afford additional room for access to the rear seat, said linkage including an adjustable link, the length of which may be varied to vary the normal inclination of the seat back without substantially affecting the range of movement of the latter during door movement.

4. A vehicle body comprising a body wall having a single door therein, a front seat and a rear seat to which the door affords access, the back of the front seat being adapted to swing about a pivotal axis near its lower end, and linkage connecting the door and seat back so that the seat back swings forwardly when the door is opened, thus to afford additional room for access to the rear seat, said linkage having a part cooperating with a fixed part of the vehicle to act as stop means in limiting the swinging movement of the door to a predetermined angle.

5. A vehicle body comprising a body wall having a single door therein, a front seat and a rear seat to which the door affords access, the back of the front seat being adapted to swing about a pivotal axis near its lower end, linkage connecting the door and seat back so that the seat back swings forwardly when the door is opened, thus to afford additional room for access to the rear seat, said linkage including a slidable cam block disposed adjoining the seat, and a connection operable to effect movement of the seat back in response to movement of the block.

6. A vehicle body comprising opposite body walls, a rear seat and two front seats arranged side by side, each body wall having a single door to afford access to the front and rear seats, each front seat having a back portion mounted to swing about a substantially horizontal axis near its lower end, and linkages connecting each door with the corresponding seat back, said linkages being arranged automatically to cause a forward swinging movement of the corresponding seat back in response to the opening of the corresponding door.

7. A vehicle body comprising a body wall having a single swinging door section and an adjoining rear section, a front seat beside the door, a rear seat beside the rear section, said front seat having a fixed bottom portion and having a back portion normally disposed adjoining the front of the rear section, said back portion being movable in relation to the bottom of the seat and being connected to the door so that it moves away from its normal position in response to the movement of the door toward its open position, thus affording room for access to the rear seat, whereby the position of a person sitting on the bottom of the front seat need not be substantially disturbed.

RAYMOND L. CARR.